(12) United States Patent
Vempati et al.

(10) Patent No.: US 10,871,090 B1
(45) Date of Patent: Dec. 22, 2020

(54) ENGINE OIL PRESSURE REGULATION SYSTEM

(71) Applicant: Ford Global Technologies, LLC, Dearborn, MI (US)

(72) Inventors: Abhijyoth Vempati, Northville, MI (US); David Simon, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/446,504

(22) Filed: Jun. 19, 2019

(51) Int. Cl.
    *F01M 1/16* (2006.01)
    *F16K 17/00* (2006.01)
    *F16K 17/08* (2006.01)

(52) U.S. Cl.
    CPC .............. *F01M 1/16* (2013.01); *F16K 17/003* (2013.01); *F16K 17/085* (2013.01)

(58) Field of Classification Search
    CPC ........ F01M 1/16; F16K 17/003; F16K 17/085
    See application file for complete search history.

(56) References Cited

U.S. PATENT DOCUMENTS

| | | | |
|---|---|---|---|
| 5,094,201 A | 3/1992 | Bedi | |
| 5,755,197 A | 5/1998 | Moorman et al. | |
| 6,148,789 A | 11/2000 | Johns | |
| 6,463,908 B1 * | 10/2002 | Gibson | F02M 57/025 123/196 M |
| 7,240,657 B2 | 7/2007 | Watanabe | |
| 8,464,684 B2 | 6/2013 | Kusel | |
| 8,510,018 B2 | 8/2013 | Kato | |
| 8,601,809 B2 | 12/2013 | Johansson et al. | |
| 9,650,922 B2 | 5/2017 | McConville | |
| 10,181,869 B2 | 1/2019 | Pullela et al. | |
| 2005/0028780 A1 * | 2/2005 | Aliev | F01M 5/025 123/196 R |
| 2011/0277850 A1 * | 11/2011 | Greene, III | F16K 17/042 137/14 |
| 2013/0174802 A1 * | 7/2013 | Liimatta | F01M 1/12 123/196 R |
| 2017/0159516 A1 * | 6/2017 | Roth | F02M 26/01 |

FOREIGN PATENT DOCUMENTS

| | | |
|---|---|---|
| CA | 1330026 C | 6/1994 |
| JP | 55131816 A * | 10/1980 |
| JP | 2001073725 A | 3/2001 |
| WO | 2018047049 A1 | 3/2018 |
| WO | WO-2018055486 A1 * | 3/2018 ............... F01M 1/02 |

* cited by examiner

*Primary Examiner* — Jacob M Amick
*Assistant Examiner* — Charles Brauch
(74) *Attorney, Agent, or Firm* — Geoffrey Brumbaugh; McCoy Russell LLP (57) ABSTRACT

Methods and systems are provided for a lubricant system for an engine. In one example, the system includes external delivery lines coupling an oil reservoir of the engine to a plurality of cylinder head oil galleries, the engine also having internal oil passages. An amount of hydraulic fluid delivered via the external delivery lines is controlled by a pressure control valve having a vent line.

19 Claims, 8 Drawing Sheets

FIG. 8

ENGINE OIL PRESSURE REGULATION SYSTEM

FIELD

The present description relates generally to methods and systems for controlling oil pressure in an engine.

BACKGROUND/SUMMARY

An internal combustion engine includes various moving components, the motion of the components enabling engine operations and providing torque to propel the vehicle. The moving components may be lubricated with oil to reduce friction of the moving components. For example, a cylinder head of the engine may include one or more internal passages flowing oil from an oil sump or reservoir to oil galleries in the cylinder head. The oil galleries may deliver oil to cylinder head components such as a camshaft as well as parts coupled to the camshaft. The oil may form films between adjacent moving parts, allowing the components to move with reduced friction and thereby increasing a lifetime of the components.

Consistent cylinder head oil pressure may be difficult to maintain due to variations in oil temperature, slosh, fuel dilution of the oil, aeration, etc. The engine may experience a wide range of operating conditions that may lead to fluctuating oil pressure in the cylinder head, which may adversely affect engine operation. For example, inconsistent cylinder head oil pressure may cause variations in cam lobe operation and valve actuation, resulting in poor engine performance.

Attempts to address inconsistent cylinder head oil pressure include equipping an engine lubricant system with a device to control oil pressure. One example approach is shown in Chinese Patent No. 101818669. Therein, an oil supply system for an engine includes a distribution network coupled to an oil pump. A main pressure reducing valve is connected to the distribution network downstream of the oil pump and determines a maximum pressure setting of the distribution network. An auxiliary pressure reducing valve is coupled to the distribution network downstream of the main pressure reducing valve and configured to return oil from the distribution network to an oil reservoir of the oil supply system. The auxiliary pressure reducing valve may operate in a first mode in which the auxiliary pressure reducing valve actively controls the pressure in the distribution network, reducing the pressure to a first pressure that is lower than the main pressure reducing valve. The first operating mode may enable oil pressure to be reduced to provide fuel economy benefits when high oil pressure and flow is not demanded. In a second operating mode, which may be a normal operating mode, the auxiliary pressure reducing valve adjusts the distribution network pressure to a second pressure that is higher than the first pressure, e.g., similar to the maximum pressure set by the main pressure reducing valve.

However, the inventors herein have recognized potential issues with such systems. As one example, oil flow may be high during operation of the auxiliary pressure reducing valve in the normal, second mode, leading to parasitic losses when the auxiliary pressure reducing valve is not operating in the first mode. In addition, the oil pressure may overshoot under cold oil conditions, causing a hydraulic lash adjuster pump-up. Furthermore, the use of pressure reducing valves may not address variations in cylinder head oil pressure which may cause valvetrain instability.

In one example, the issues described above may be addressed by a method for a system including delivery lines, arranged external to an engine, the delivery lines coupling an oil reservoir of the engine to a plurality of cylinder head oil galleries along an external surface of the engine, the oil reservoir also coupled to the plurality of cylinder head oil galleries via oil passages internal to the engine, a pressure control valve, arranged external to the engine, for controlling an amount of hydraulic fluid delivered through the delivery lines, each of the delivery lines coupled to the pressure control valve, and an external vent line configured to couple the pressure control valve to the oil reservoir when the pressure control valve is degraded. In this way, oil pressure may be supplied to the cylinder head in addition to oil supplied by internal passages of the engine to both increase the oil pressure and maintain a uniform oil pressure across all engine cylinder head oil galleries.

As one example, the external delivery lines include a feed line flowing the hydraulic fluid from the oil reservoir to the pressure control valve and external passages flowing the hydraulic fluid from the pressure control valve to the cylinder head oil galleries. The flow of hydraulic fluid to the cylinder head oil galleries supplements hydraulic pressure in the oil galleries provided by the internal oil passages and the hydraulic pressure in the oil galleries is maintained consistent by the pressure control valve. In this way, a single device may be used to efficiently control cylinder head oil pressure. The device may accommodate a wide range of engine operating conditions with reduced parasitic losses and continue controlling cylinder head oil pressure even if there is degradation in the pressure control valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4-7 are shown approximately to scale

DETAILED DESCRIPTION

The following description relates to systems and methods for controlling oil pressure in a cylinder head of an engine.

Figure 1:
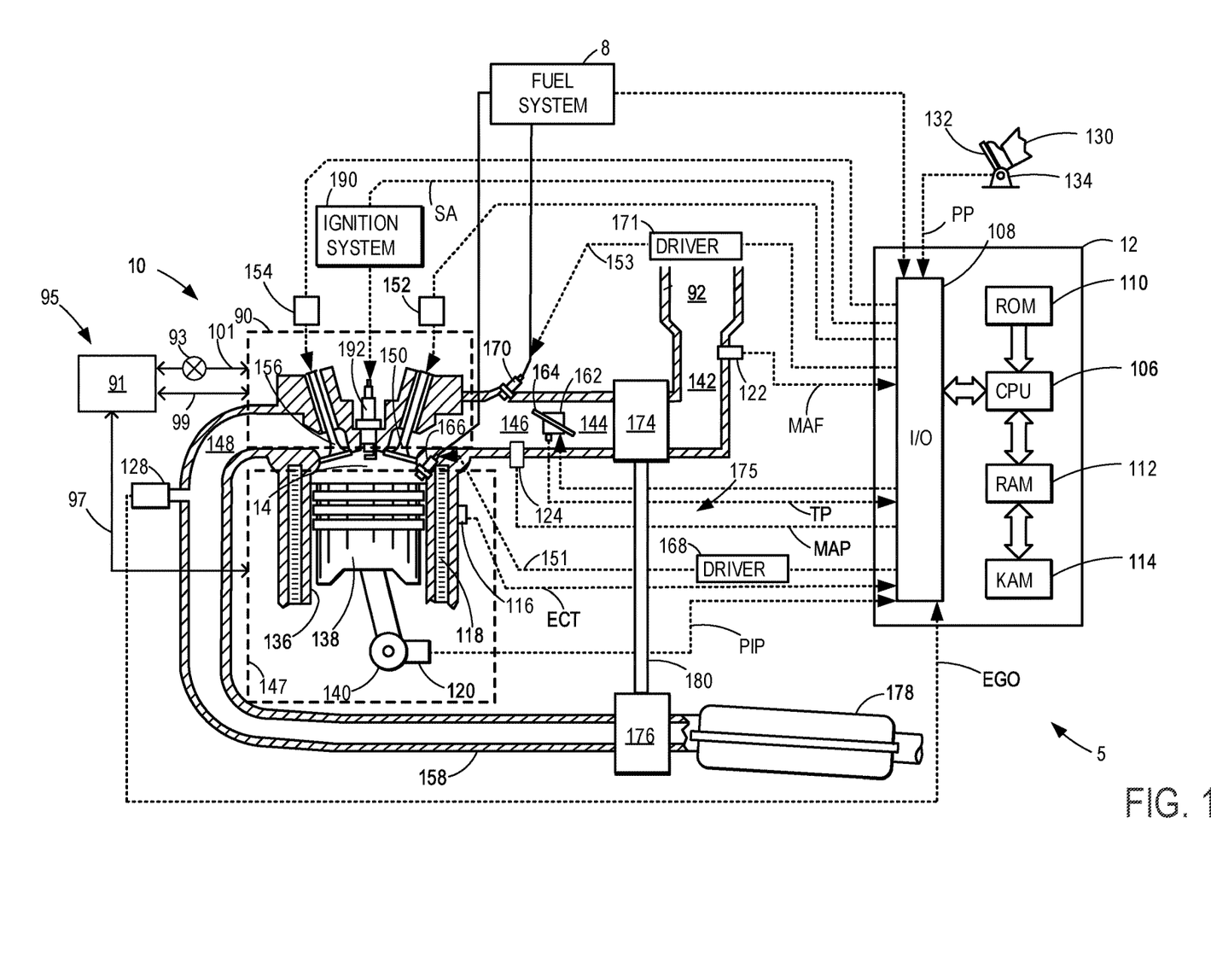
FIG. 1 shows a schematic diagram of an engine which may be lubricated by a lubricant system.
Figure 2:
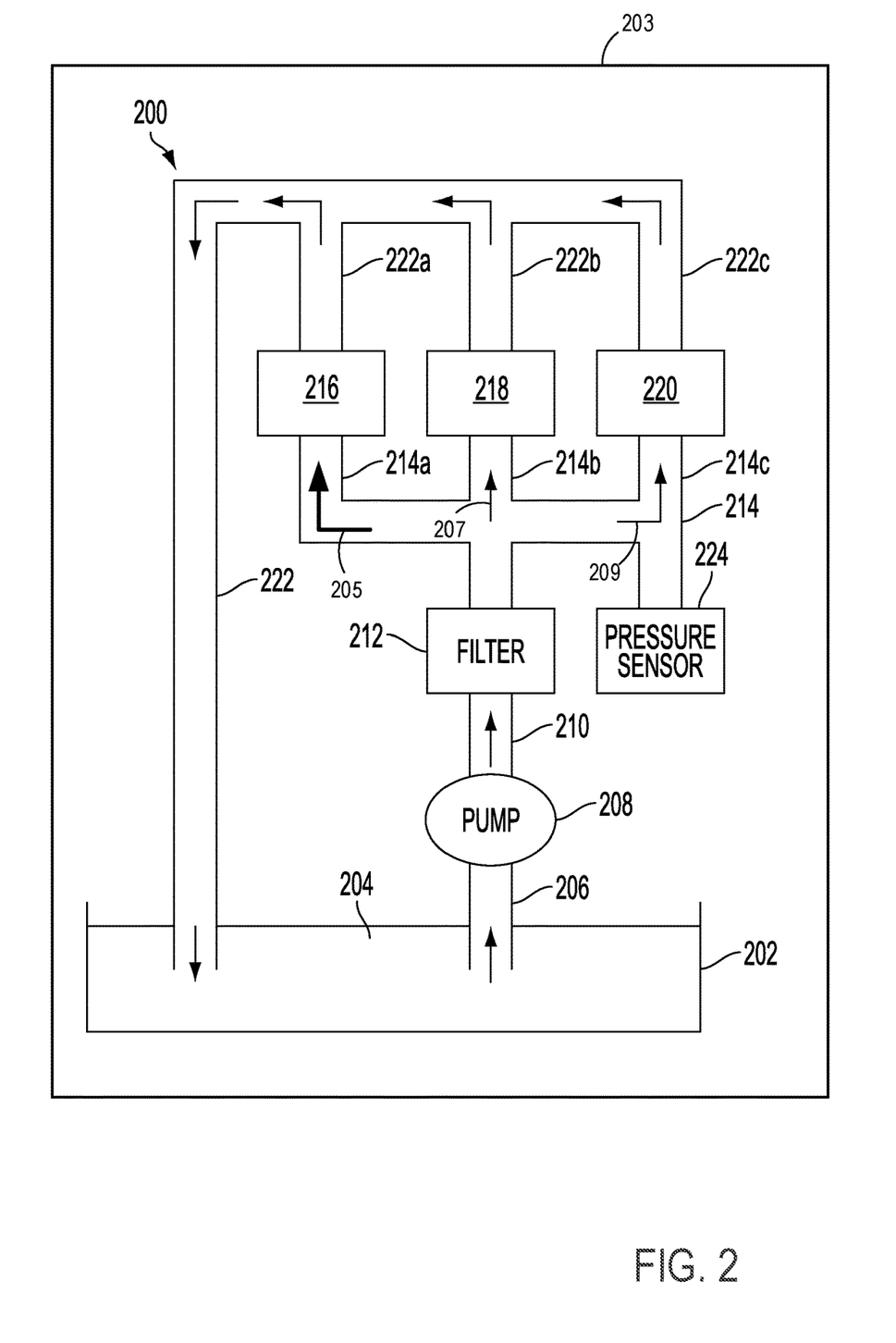
FIG. 2 shows a schematic diagram of an engine lubricant system.
Figure 7:
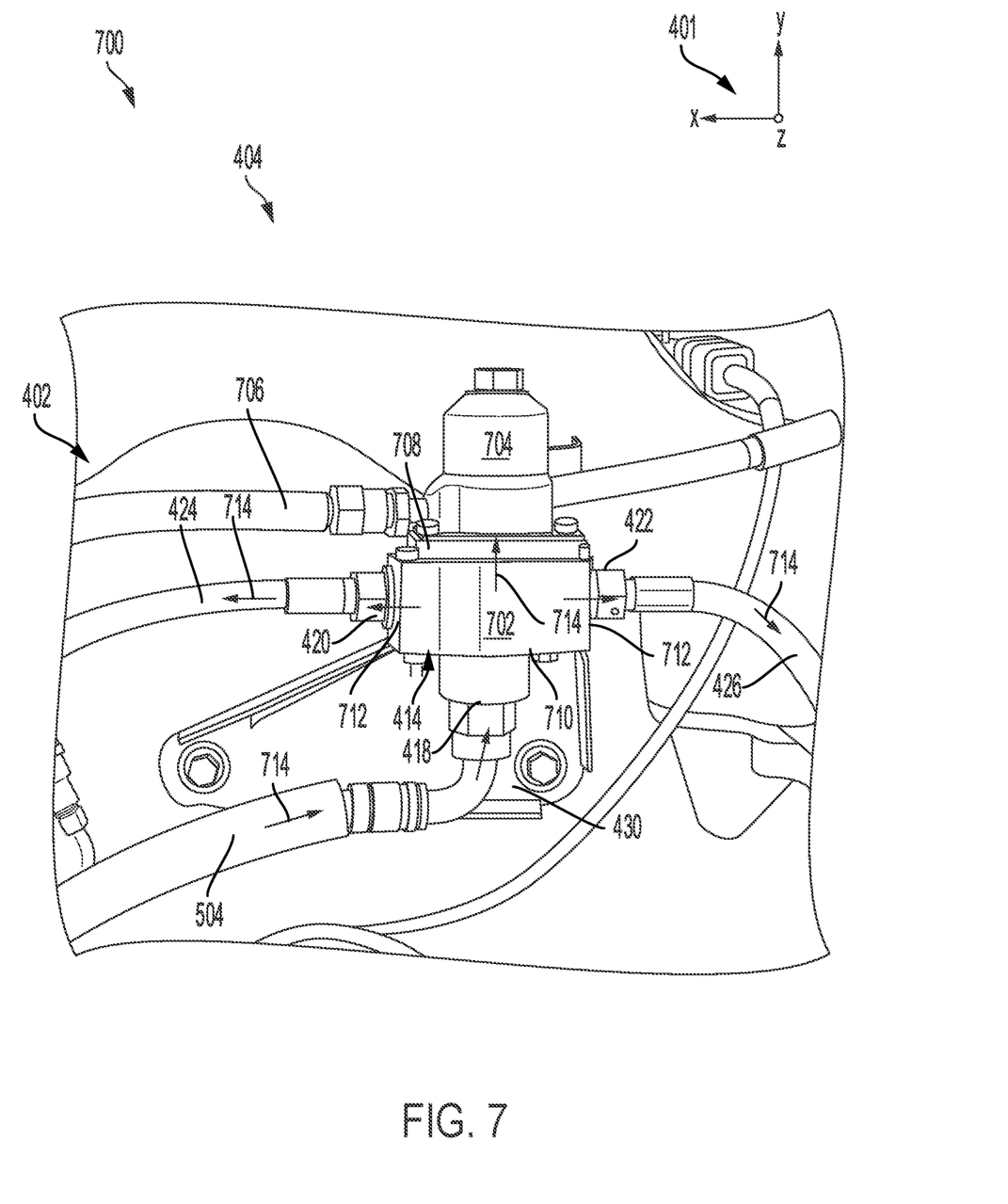
FIG. 7 shows a zoomed-in view of the pressure control valve of the pressure regulation system shown in FIG. 4.
Figure 8:
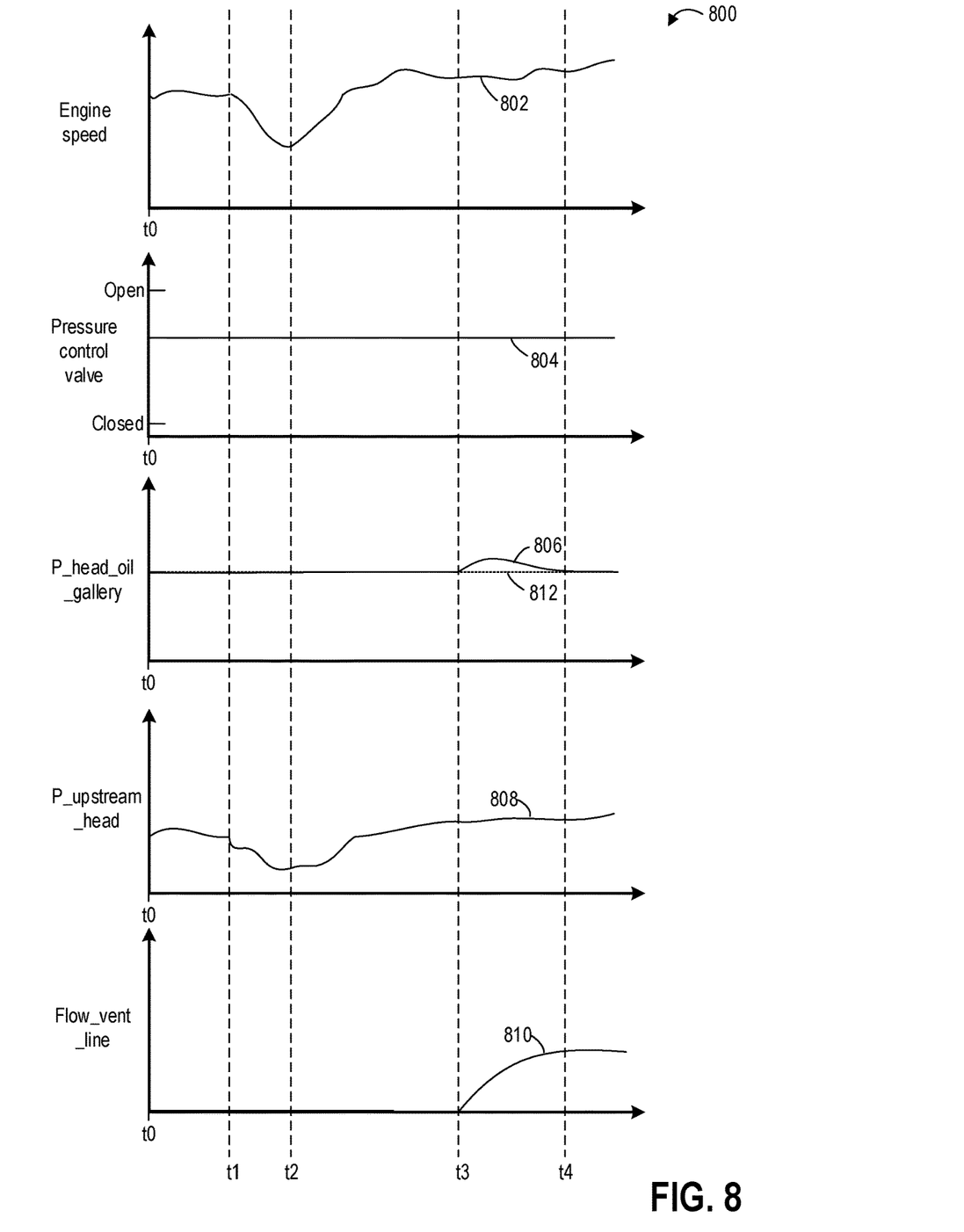
FIG. 8 shows example operations of components of the pressure regulation system during engine operation.

The cylinder head and other components of the engine may be lubricated by a lubricant system circulating oil through the engine. An example of an engine is shown in FIG. 1, the engine relying on oil flow to a cylinder head to reduce friction between moving components in the cylinder head. An example of an engine lubricant system is shown in FIG. 2, depicting a general pathway of oil delivery to various components of the engine. An internal pathway of oil delivery through the engine is further shown in an example of an engine in FIG. 3, including oil flow through cylinder head oil galleries. In order to maintain a uniform oil pressure in the cylinder head, the oil galleries may each be coupled to a pressure control valve of a pressure regulation system, the pressure regulation system arranged external to the cylinder head and configured to deliver additional oil to specific areas of the engine and control the oil pressure in the specific areas. An example of an engine adapted with the pressure regulation system is shown in FIGS. 4-7, illustrating oil passages external to the engine as well as a vent line coupled to the pressure control valve. Example operations of the pressure regulation system are depicted in FIG. 8.

Turning now to the figures, FIG. 1 depicts an example of a vehicle 5 including a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein and a cylinder head (e.g., head) 90 positioned above cylinder 14. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146 (which may be referred to herein as intake lines). In some examples, intake air passage 146 may be one of a plurality of passages of an intake manifold of the engine 10, with each passage of the plurality of passages being coupled to a separate cylinder of the engine 10. Intake air passage 142 may be the most upstream intake air passage of the series of intake air passages shown in FIG. 1, and may include an airbox 92 at an inlet of the intake air passage 142.

In some examples, one or more of the intake passages may include a boosting device such as a turbocharger or a supercharger. For example, FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Cylinder 14 may be one combustion chamber amongst several combustion chambers included in an engine block 147, which may also include a crank case enclosing the combustion chambers and the crankshaft 140. The engine 10 may rely on circulation of a hydraulic fluid, such as oil, through a lubrication system 95, which flows oil from an oil reservoir 91 to various engine components, such as the crankshaft 140 and the engine block 147 and the head 90 to lubricate moving parts and reduce friction. Flow of oil through the engine via a lubricant system such as the lubrication system 95 is described further below with reference to FIGS. 2 and 3.

A first portion of oil may be pumped to the engine block 147 via a first set of internal passages 97 in the engine block 147 and a second portion of oil may be pumped to the head 90 via a second set of internal passages 99 in the head 90 by an engine oil pump (not shown in FIG. 1) from the oil reservoir 91. In some examples, the oil reservoir 91 may be a wet sump in the engine block 147, configured to collect oil draining from lubricated components of the engine block 147 and the head 90. In other examples, the oil reservoir 91 may be positioned internal or external to the engine block 147 and coupled to a dry sump in the engine block 147 that collects oil and continually feeds the oil to the oil reservoir 91.

The lubrication system 95 may include, in some examples, a pressure control valve 93 positioned between the oil reservoir 91 and the head 90 and arranged in a set of external oil passages 101. The pressure control valve 93 may be coupled to oil galleries of the head 90 by the set of external oil passages 101 and an oil pressure amongst the oil galleries of the head 90 may be maintained uniform by the pressure control valve 93. The set of external oil passages 101 may deliver oil to the oil galleries in addition to the oil delivered to the oil galleries via the second set of internal passages 99 of the head 90. Further details of the pressure control valve 93 and the set of external oil passage 101 are provided below with reference to FIGS. 4-8.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof.

Cylinder 14 can have a compression ratio, which is the ratio of volumes when piston 138 is at a maximum volume position to a minimum volume position. In some examples, these positions may correspond to bottom dead center and top dead center but may correspond to other piston positions when the engine is configured with offset cranks. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly in response to a first signal 151 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from the fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in response to a second signal 153 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. The controller 12 receives signals from the various sensors of FIG. 1 and employs the various actuators of FIG. 1 to adjust engine operation based on the received signals and instructions stored on a memory of the controller. For example, adjusting an amount of intake air flowing to the cylinder 14 via intake passage 146 may include adjusting a position of the throttle 162 (e.g., an amount of rotation of the throttle plate 164) in order to increase or decrease airflow from the intake passage 144 to the intake passage 146.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

As described above, frictionless motion of engine components may be enabled by circulating oil through an engine via a lubrication system. FIG. 2 shows an example embodiment of an engine oil lubrication system 200 with an oil pump 208 coupled to a crankshaft, e.g., crankshaft 40 of FIG. 1, and including a first oil subsystem 216, a second oil subsystem 218, and a third oil subsystem 220. The lubrication system 200 is enclosed within an engine 203. In some examples, the lubrication system 200 may a non-limiting example of the lubrication system 95 of FIG. 1. The oil subsystems may utilize oil flow to perform a function, such as lubrication, actuation of an actuator, etc. For example, the first oil subsystem 216 may be a main oil gallery supplying oil to a crankshaft and pistons of the engine 203. A first portion of oil flow, indicated by arrow 205 may be larger than both a second portion of oil flow, indicated by arrow 207 delivered to the second oil subsystem 218 and a third portion of oil flow, indicated by arrow 209, delivered to the third oil subsystem 220. As a result, a smaller amount of oil with a lower hydraulic pressure is provided to the second and third oil subsystems 218, 220, than the first oil subsystem 216. For example, an oil pressure in the main oil gallery may be 75 psi and oil pressure in the cylinder head oil galleries (as provided by internal oil passages in the engine 203) may be 10-15 psi during high engine loads. Further, the second oil subsystem 218 may be a lubrication system, such as a passageway for delivering oil to oil galleries in a cylinder head of the engine 203 to lubricate moving components, such as the camshafts, cylinder valves, etc. For example, the first oil subsystem 216 may be an engine block lubrication system, the second oil subsystem 218 may be a cylinder head lubrication system, and the third oil subsystem 220 may be a pressure regulation system such as the pressure regulation system of FIGS. 4-7, delivering oil to the cylinder head via an external set of oil passages, e.g., the set of external oil passages 101 of FIG. 1, coupled to a pressure control valve such as the pressure control valve 93 of FIG. 1. Still further non-limiting examples of the oil subsystems include camshaft phasers, cylinder walls, miscellaneous bearings, etc. In some embodiments, there may be fewer or more oil subsystems.

Continuing with FIG. 2, the oil pump 208, which may be actuated by the rotation of the crankshaft, sucks oil from oil reservoir 204, stored in oil pan 202, through supply channel 206. Oil is delivered from oil pump 208 with pressure through supply channel 210 and oil filter 212 to main gallery 214. The pressure within the main gallery 214 is a function of the force produced by oil pump 208 and the flow of oil entering each oil subsystem 216, 218, 220 through supply channels 214a, 214b, 214c, respectively. Oil returns to oil reservoir 204 at atmospheric pressure through return channel 222. Oil pressure sensor 224 measures main gallery oil pressure and sends the pressure data to a controller, e.g., controller 12 of FIG. 1. Pressure within the main gallery 214 may be increased or decreased by respectively increasing or decreasing the force produced by oil pump 208 in response to signals received from the controller, for example. In other examples, the force produced by of pump 208 may be passively controlled by engine operations driving rotation of the crankshaft.

Figure 3:
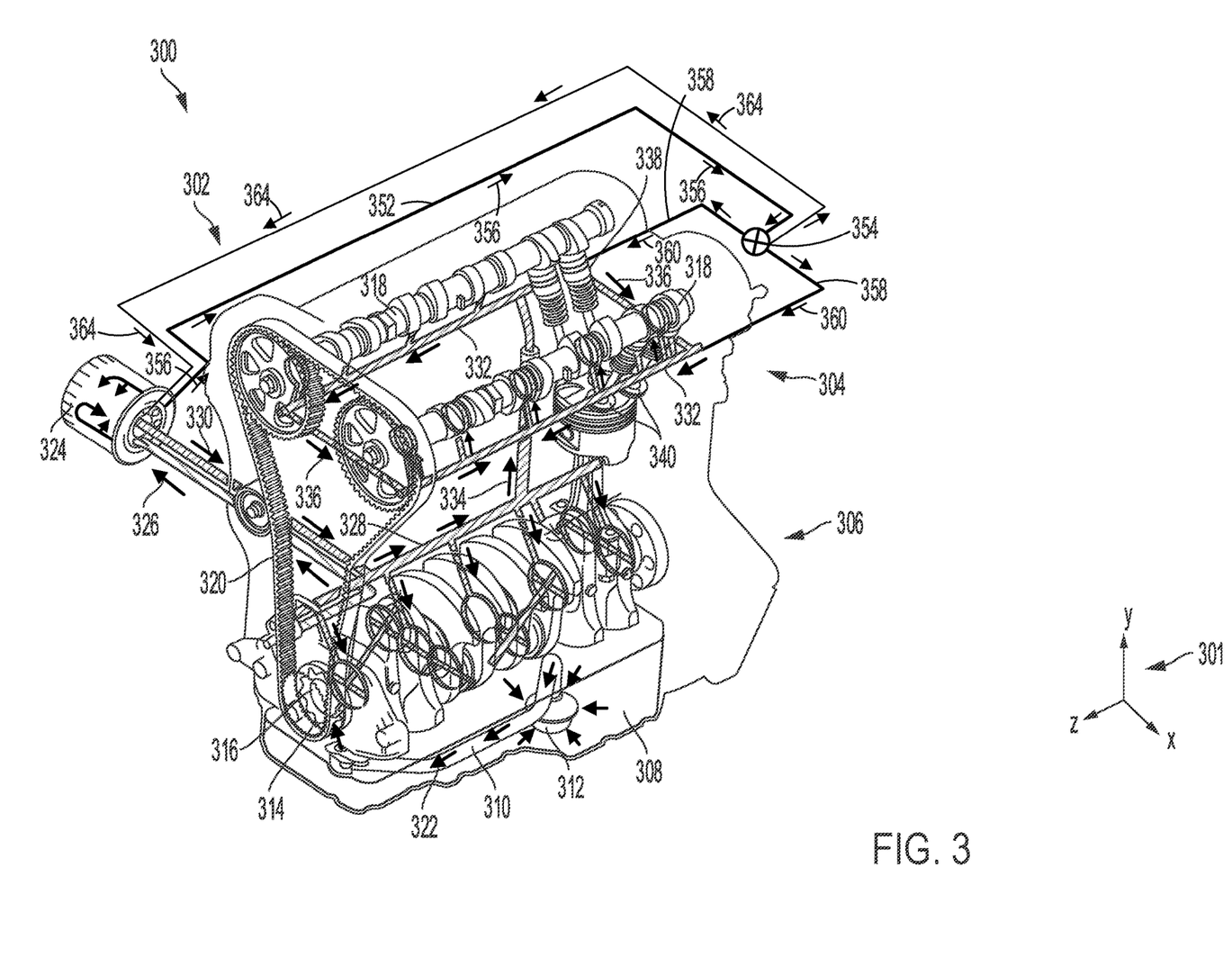
FIG. 3 shows a flow of oil within an engine through oil galleries in a cylinder head and a block of the engine.

A hydraulic pressure in a main oil gallery of an engine lubricant system may affect pressure at other regions of an engine. For example, a schematic diagram 300 of an engine 302 is shown in FIG. 3. Engine 302 may be a non-limiting example of engine 10 of FIG. 1. A set of reference axis 301 are provided, indicating an x-axis, a y-axis, and a z-axis. The engine 302 includes a cylinder head, or head 304, arranged above an engine block 306, with respect to the y-axis and may be adapted with one or more subsystems of a lubricant system, such as the first, second, and third subsystems 216, 218, 220 of the lubrication system 200 of FIG. 2. The engine 302 has a plurality of oil passages and channels distributed within the head 304 and the engine block 306 to provide oil to moving components of the engine 302. An oil sump 308 may be disposed at a bottom of the engine block 306, coupled to an oil feed line 310 through a sump strainer 312. The oil feed line 310 extends between the sump strainer 312 (configured to inhibit entrainment of particulate matter from the oil sump 308 into oil passages of the engine 302) and an oil pump 314 arranged in the engine block 306.

The oil pump 314 may be driven by mechanical coupling to a crankshaft 316 in the engine block 306 and to camshafts 318 in the head 304 by a loop 320, e.g., a timing belt or chain. Operation of the oil pump 314 increases oil pressure and forces oil to flow from the oil sump 308 to the oil pump 314, as indicated by a first set of arrows 322. The oil continues from the oil pump 312, through an oil filter 324, as indicated by a second set of arrows 326, and from the oil filter 324 to a main oil gallery 328, as indicated by a third set of arrows 330.

The main oil gallery 328 is positioned in the engine block 306 and distributes oil to moving components within the engine block 306 such as the crankshaft 316. The main oil gallery 328 is also coupled to cylinder head oil galleries 332, as indicated by arrow 334, enabling oil to circulate through the head 304 as indicated by a fourth set of arrows 336 and lubricating the camshafts 318. The pressure provided by the oil may enable operation of hydraulic lash adjusters 338 positioned between the camshaft 318 and engine valves 340, e.g., intake and exhaust poppet valves, where the hydraulic lash adjusters 338 may be configured to maintain zero valve clearance of the engine valves 340. Oil may return to the oil sump 308 as it is forced out of bearings, e.g., bearings of the camshafts 318 and crankshaft 316, and drips down.

The engine 302 is further adapted with a pressure regulation system 350. The pressure regulation system 350 may be a non-limiting example of the pressure regulation system 220 (e.g., the third oil subsystem 220) of FIG. 2. The pressure regulation system 350 includes an oil feed line 352, extending between the oil filter 324 and a pressure control valve 354 along an external surface of the engine 302. The pressure control valve 354 is also arranged outside of the engine 302. Oil flows from the oil filter to the pressure control valve 354 through the oil feed line 352, as indicated by arrows 356, and continues from the pressure control valve 354 to the cylinder head oil galleries 332 via external oil passages 358. Each of the external oil passages 358 extends from the pressure control valve 354, through an external surface of the engine 302, to one of the cylinder head oil galleries 332. Oil flow through the external oil passages 358 is indicated by arrows 360.

Oil pressure in the engine 302 may vary amongst different regions of the lubrication system 302. Oil in the main oil gallery 328 may be relatively high due to an arrangement of the main oil gallery 328 directly downstream of the oil filter 324. A relatively small portion of the oil in the main oil gallery is channeled to the cylinder head oil galleries 332, as indicated in FIG. 2, resulting in a lower oil pressure in the cylinder head oil galleries 332 than in the main oil gallery 328. During some instances, the oil pressure in the cylinder head oil galleries 332 may be undesirably low. Additional oil pressure may be provided by the pressure regulation system 350. By delivering oil to the cylinder head oil galleries 332 directly from the oil filter 324, the oil pressure in the cylinder head oil galleries 332 may be enhanced. Oil may flow continuously through the pressure regulation system 350 when the oil pump 314 is operating, the higher pressure upstream of the pressure control valve 354 (provided by the oil filter 324) than downstream of the pressure control valve 354 (e.g., the pressure in the head oil galleries), thereby maintaining the pressure control valve 354 open. Further details of the pressure regulation system is described below, with reference to FIGS. 4-8.

The pressure regulation system 350 also has a vent line 362, coupled at one end to the pressure control valve 354 and flowing oil from the cylinder head oil galleries 332 to the oil filter 324 where oil is returned to the oil sump 308. The flow through the vent line 362, travelling in an opposite direction from flow through the oil feed line 352, is indicated by arrows 364. The vent line 362 may flow oil to alleviate oil pressure when pressure in the cylinder head oil galleries 332 rises above a preset level of pressure.

In other examples, an oil pressure in the engine 302, downstream of the oil pump 314, may be adjusted by a pressure relief valve instead of the pressure control valve 354. The pressure relief valve may open when the oil pump 314 produces a higher oil pressure than demanded by engine operation to vent excess pressure and return oil directly to the oil sump 308 via a bypass, thus maintaining oil pressure below a threshold pressure level and reducing degradation to oil seals resulting from exposure to high pressure. However, the pressure relief valve may not address issues arising from insufficiently high oil pressure in the head 304, particularly for performance vehicles. Operation of the camshafts 318 and a valvetrain of the engine 302 may rely on higher oil pressures in the cylinder head oil galleries 332 than provided by the pressure relief valve. In some instances, operation of components in the head 304 may demand higher pressure than provided by the oil pump 314 through internal oil passage of the engine 302. Furthermore, the pressure in the head 304 is prone to fluctuations in response to variations in engine operating conditions which may affect a temperature of the oil, aeration, slosh, and dilution by fuel, and lead to changes in pressure. A single size pressure relief valve may not be able to accommodate the wide range of pressures and temperatures imposed by engine operations in the performance vehicle. As a result, oil pressure may differ between cylinder head oil galleries and contribute to valvetrain instability.

The issues described above may be at least partially addressed by adapting a lubricant system with a pressure regulation system including external oil passages coupling oil galleries of a cylinder head to a pressure control valve. The pressure control valve may provide oil to the head in addition to oil delivered via internal passages, as shown in FIG. 3, at a consistent oil pressure, particularly during engine operations under elevated oil temperatures and aeration. The pressure control valve may also be positioned external to the engine thereby allowing the pressure regulation system to be readily adapted to already existing engine lubricant systems and to both wet and dry sumps. A vent line of the pressure control valve may alleviate oil pressure if the pressure control valve becomes degraded and is stuck open. Thus the pressure regulation system may be retrofit to a variety of engine systems and may increase engine performance by maintaining a uniform, regulated cylinder head pressure, particularly in performance vehicles operating for prolonged periods at high engine oil temperatures and pressures.

Figure 4:
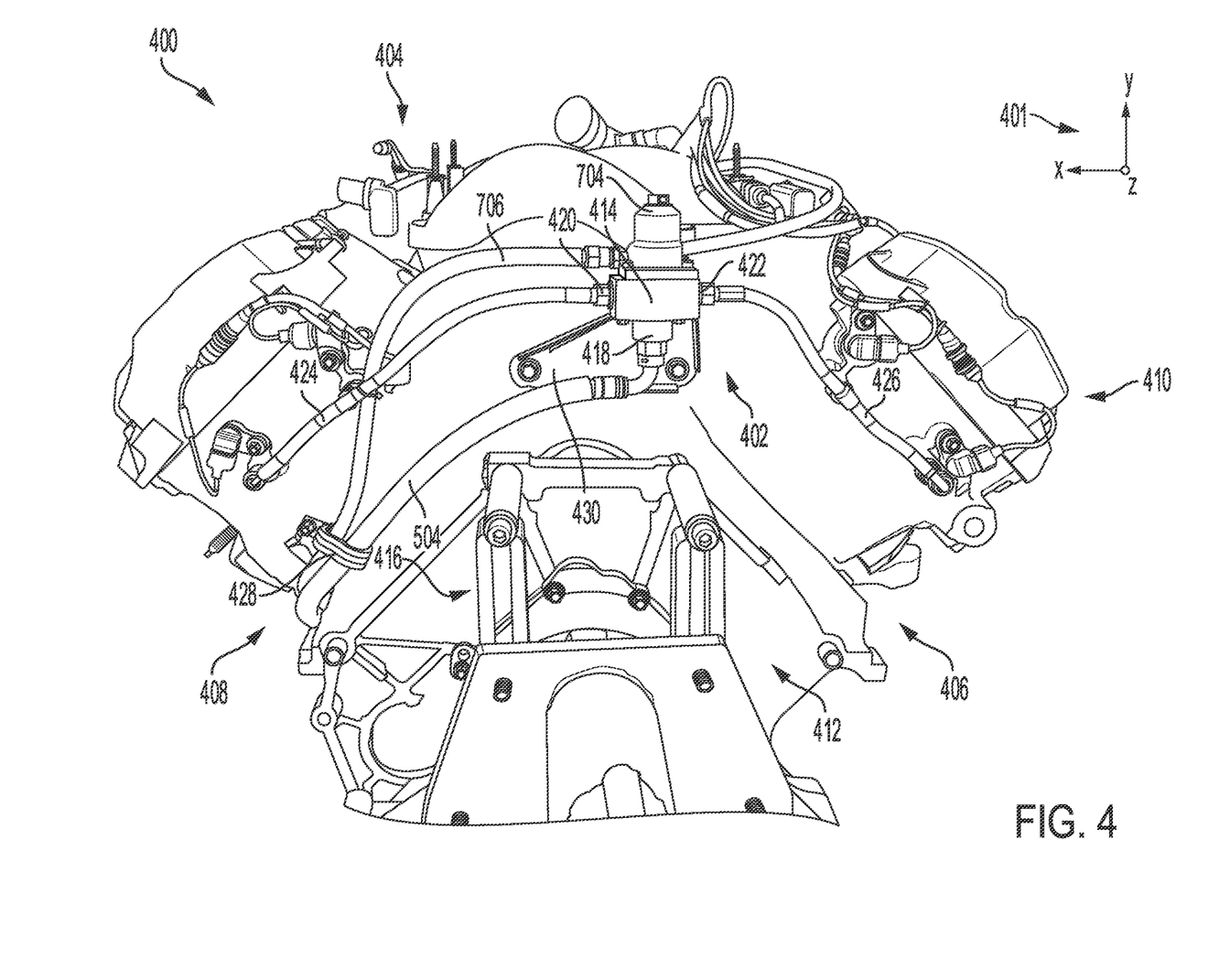
FIG. 4 shows a rear view of an example of an engine adapted with a pressure regulation system feeding oil to a cylinder head of the engine via external oil passages and a pressure control valve.

An example of a pressure regulation system 402, as described above, is shown in FIGS. 4-7, depicting an engine 404 from a rear view 400, a left-side view 500, a first zoomed-in view 600 of a coupling of external oil passages to cylinder head oil galleries, and a second zoomed-in view 700 of a pressure control valve, respectively. In some examples, the engine 404 may be the engine 10 of FIG. 1, adapted with a lubricant system such as the lubrication system 200 of FIG. 2 flowing oil to oil subsystems of the engine (e.g., the subsystems 216, 218, and 220 of FIG. 2). A set of reference axis 401 is provided for comparison between views. The set of reference axes 401 may be similar to the set of reference axes 301 of FIG. 3. As shown in FIG. 4, the engine 404 includes a right-side cylinder bank 406 and a left-side cylinder bank 408. A cylinder head 410, referred to as a head 410 herein, is stacked above an engine block 412, with respect to the y-axis.

Figure 5:
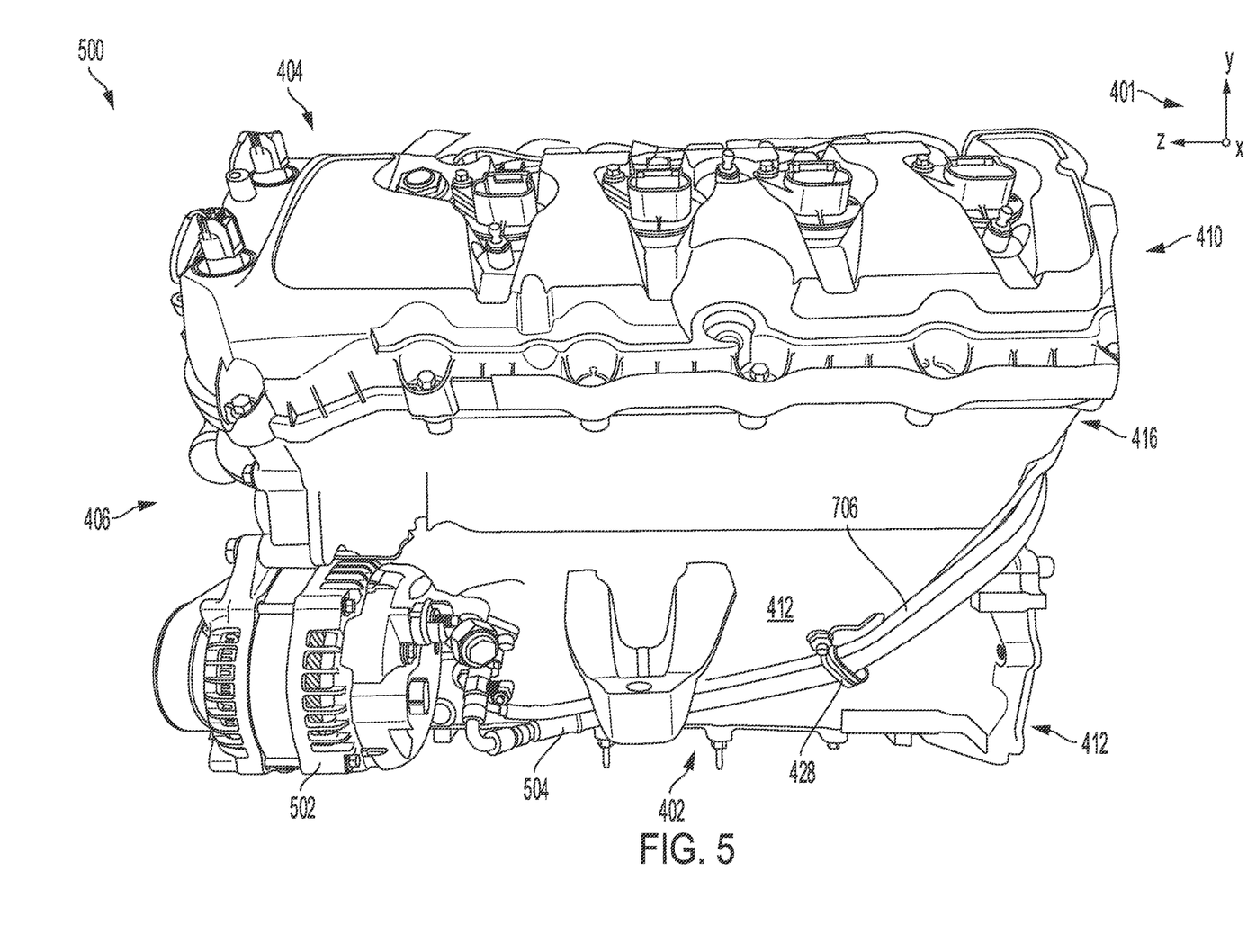
FIG. 5 shows a left side view of the engine of FIG. 4.

Oil may be pumped from an oil sump (e.g., the oil sump 308 of FIG. 3) in the engine block 412 to an oil filter 502, the oil filter 502 shown in FIG. 5, through internal (e.g., inside of the engine 404) oil passages. In contrast, the pressure regulation system 402 routes an external oil feed line 504, as shown in FIG. 5, from the oil filter 502 to a pressure control valve 414, as shown in FIGS. 4 and 7, the external oil feed line 504 extending along an exterior surface of a left side of the engine block 412, e.g., below the left-side cylinder bank 408. The oil filter 502 may receive oil from an oil pump (e.g., the oil pump 208 of FIG. 2 or 314 of FIG. 3), the oil pressurized downstream of the oil pump due to a flow restriction in an outlet line between the pump and the oil filter 502. Thus, the oil flowing through the external oil feed line 504 from the oil filter 502 to the pressure control valve 414 is also pressurized. The external oil feed line 504 may continue around a rear side 416 of the engine 404, as shown in FIG. 4, and couple to an inlet 418 of the pressure control valve 414. In one example, the oil feed line 504 may be formed from a heat and pressure-tolerant, durable material such as braided stainless steel. Furthermore, in some examples, the oil feed line 504 may be encased by a heat-shielding material to reduce exposure of the oil feed line 504 to heat radiating from an exhaust manifold of the engine 404.

The pressure control valve 414 may be positioned at the rear side 416 of the engine 404, fixedly attached to the engine 404, above the engine block 412 and between the left-side cylinder bank 408 and the right-side cylinder bank 406, by a mount 430. The mount 430 may be a metal bracket or plate that enables the pressure control valve 414 to be coupled to an exterior surface of the engine 404 by a fastening device, such as bolts or clips. The pressure control valve 414 may have a first outlet 420 and a second outlet 422 arranged along opposite sides 712 of a body 702 of the pressure control valve 414, as shown in FIG. 7. The body 702 of the pressure control valve 414 may be rectangular with inlets and outlets protruding from the body 702. A first oil passage 424 may couple the first outlet 420 of the pressure control valve 414 to a first set of head oil galleries in the head 410 above the left-side cylinder bank 406, the first oil passage 424 extending along a first direction, e.g., to the left side of the engine 404 in FIG. 4, away from the pressure control valve 414. A second oil passage 426 may couple the second outlet 422 of the pressure control valve 414 to a second set of head oil galleries in the head 410 above the right-side cylinder bank 408. The second oil passage 426 may extend in an opposite direction from the first oil passage 426, e.g., to the right in FIG. 4, away from the pressure control valve 414. The first and second sets of head oil galleries within the head 410 may be similar to the cylinder head oil galleries 318 shown in FIG. 3, supplying oil to lubricate camshafts and operate hydraulic lash adjusters, for example. A detailed view of the coupling of the first oil passage 424 to the first set of head oil galleries through a wall 602 at the rear side 416 of the engine 404 is shown in FIG. 6.

Figure 6:
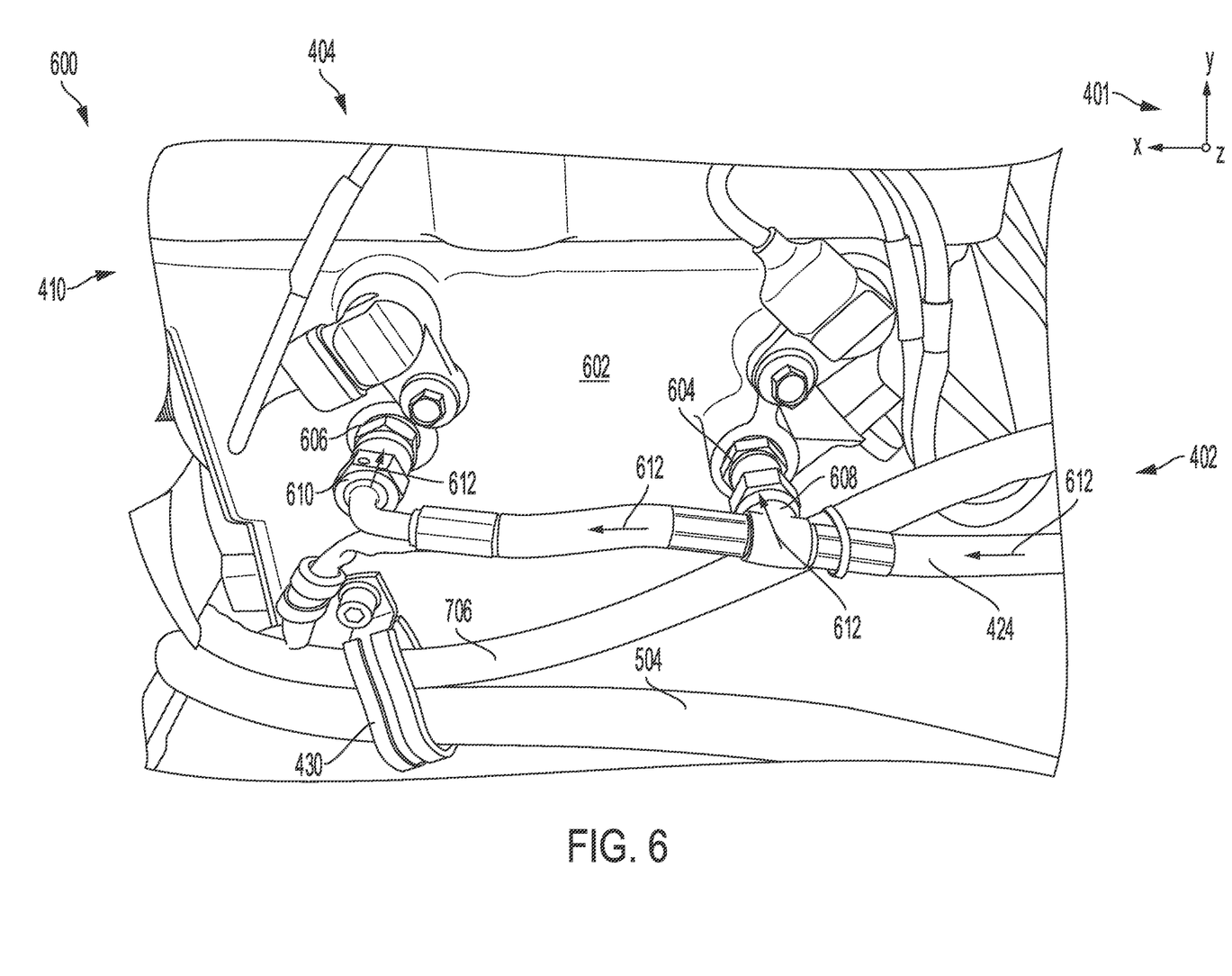
FIG. 6 shows a zoomed-in view of a coupling of the external oil passages to the cylinder head of the engine of FIG. 4.

As depicted in FIG. 6, in the engine 404, each set of head oil galleries may include inlets coupled to two head galleries corresponding to each cylinder bank of the engine 404. While FIG. 6 shows a zoomed-in view of only the first oil passage 424, the second oil passage may be similarly coupled to the second set of head oil galleries in the head 410 above the right-side cylinder bank 406. The first oil passage 424 may couple to each gallery of the first set of head oil galleries in the head 410 through a first gallery inlet 604 and a second gallery inlet 606. Each of the first and second gallery inlets 604, 606, may be openings through the wall 602 of the head 410 at the rear side 416 of the engine 404 and directly coupling the first oil passage 424 to each gallery of the first set of head oil galleries. A first branch 608 extends between the first oil passage 424 and the first gallery inlet 604, forming a T-junction in the first oil passage 424 that fluidly couples the first oil passage 424 to the first gallery inlet 604. A second branch 610 is parallel with the first branch 608 and continues from an end 612 of the first oil passage 424 to couple the first oil passage to the second gallery inlet 606. The first and second branches 608 and 610 may include fittings adapted to sealingly engage with the first oil passage 424 via, for example, threaded interfacing regions, so that oil does not leak through the fittings even when the oil is under pressure.

The oil delivered to the first set of head oil galleries via the first oil passage 424, flowing in a direction indicated by arrows 612, may supplement oil provided by the internal oil passages of the head 410, thereby increasing an oil pressure in the first set of head oil galleries of the head 410. The higher pressure may enable smoother and more stable camshaft operation as well as intake and exhaust valve actuation. Additionally, implementation of the pressure control valve 414, as shown in FIGS. 4 and 7, may regulate the oil pressure in the first (and second) set of head oil galleries thereby maintaining a more uniform pressure in the sets of head oil galleries than achieved by adapting the internal oil passages with a pressure relief valve.

The pressure control valve 414 is depicted in a second zoomed-in view 700 in FIG. 7. As described above, the external oil feed line 504 may couple the inlet 418 of the pressure control valve 414 to the oil filter 502 arranged on the left side of the engine block 412. The external oil feed line 504 may extend along the left side of the engine block 412 and continue along the rear side 416 of the engine 404 to connect to the pressure control valve 414, delivering pressurized oil from the oil filter 502. The pressurized oil enters the pressure control valve 414 through the inlet 418 and may flow into the body 702 of the pressure control valve 414. The body 702 of the pressure control valve 414 may include a valve configured to adjust an oil pressure communicated to the sets of head oil galleries through the first outlet 420 and the second outlet 422 of the pressure control valve 414.

In one example, the valve in the body 702 of the pressure control valve 414 may be a reducing valve, configured to be normally closed. The reducing valve may include an adjustable opening that controls an amount of oil flowing through the valve to achieve a target pressure in the sets of head oil galleries downstream of the pressure control valve 414 and maintain the pressure of the oil emerging from the pressure control valve 414 at the target pressure. The amount of oil added to the sets of head oil galleries may be metered to increase the hydraulic pressure in the sets of head oil galleries (provided by the internal oil passages of the engine 404) to the target pressure. For example, a main oil gallery of the engine 404, such as the main oil gallery 328 of FIG. 3, may have a hydraulic pressure of 75 psi (517 kPa) as generated downstream of the oil pump and the target pressure of the pressure control valve 414 may be 45 psi (310 kPa).

To control oil flow and maintain a uniform pressure in the first and second oil passages 424, 426, as shown in FIG. 4, the reducing valve of the pressure control valve 414 may have a spindle, a diaphragm, and a spring coupled to the spindle and exerting pressure on the diaphragm. In one example, the diaphragm may be formed from a polymer such as Viton™. The spindle may be fixedly attached to a knob 704, the knob 704 shown in FIG. 7, and rotation of the knob 704 drives rotation of the spindle. The knob 704 and the spindle may be rotated in either of two directions (e.g., clockwise and counterclockwise) to adjust the pressure exerted by the spring on the diaphragm and thereby adjusting a hydraulic pressure of the oil emerging from the pressure control valve 414. For example turning the knob 704 clockwise may increase the pressure while turning the knob 704 counterclockwise may decrease the pressure, or vice versa. Thus the target pressure may be set by rotating the knob 704 to achieve a desired pressure reduction relative to the main oil gallery pressure.

In other examples, the reducing valve may include a mechanism other than the spindle, diaphragm, and spring. For example, the pressure control valve 414 may be adapted with a solid piston to reduce the hydraulic pressure from the oil filter 502. Other types of reducing valves may be similarly used in the pressure control valve 414 without departing from the scope of the present disclosure.

The pressure control valve 414 may further include a vent line 706 coupled to the body 702 of the pressure control valve 414 and arranged substantially parallel with the external oil feed line 504 along the left side of the engine 404, as shown in FIG. 5. As shown in FIG. 7, the vent line 706 may feed into the body 702 of the pressure control valve 414 at a top 708 of the body 702, adjacent to the knob 704 and opposite of the inlet 418, the inlet 418 disposed in a bottom 710 of the body 702 of the pressure control valve 414. The first outlet 420 and the second outlet 422 may be arranged between the inlet 418 and a coupling region of the vent line 706 with the body 702 of the pressure control valve 414, at the top 708 of the body 702, along opposite sides 712 of the body 702 of the pressure control valve 414. Thus each of the first oil passage 424, the second oil passage 426, the oil feed line 504, and the vent line 706 may each attach to a different region of the body 702 of the pressure control valve 414. The passages and lines may be coupled to the body 702 by various types of fittings suitable for high pressure, high temperature fluid applications.

Oil flow into and out of the pressure control valve 414 is indicated by arrows 714 in FIG. 7. Oil enters the pressure control valve 414 through the inlet 418 and flows out through the first outlet 420 and the second outlet 422 with a reduced pressure relative to the pressure at the inlet 418. Flow through the vent line 706 may be blocked in the pressure control valve 414 until the diaphragm of the pressure control valve 414 ruptures. When hydraulic pressure in the body 702 of the pressure control valve 414 exceeds the threshold pressure set by adjusting the knob 704 the high pressure is communicated through the first oil passage 424 and the second oil passage 426 to the pressure control valve 414. If the pressure control valve 414 is degraded, all the oil in the body 702 flows through the vent line 706 to retain the oil within a lubricant system of the engine 404 and to mitigate ignition of leaked oil if the oil leaks into the engine bay. Leakage of oil in the engine bay may occur if the vent line 706 is not implemented.

For example, oil may flow through the vent line 706 when the pressure control valve 414 is degraded and unable to control the pressure of oil flowing to the sets of head oil galleries through the first oil passage 424 and the second oil passage 426. In some instances, the diaphragm of the reducing valve in the pressure control valve 414 may no longer provide a seal to control oil pressure and the pressure control valve 414 may be stuck in an open position without pressure regulation, allowing the high pressure in the oil feed line 504 to be communicated to the set of head oil galleries when the pressure control valve 414 is degraded. The high oil pressure in the oil feed line 504 may be higher than a pressure tolerance of components in the head 410 and may lead to degradation of the components and cause leakage. To circumvent exposure of the head components to high pressures and oil leakage from the head 410, the pressure control valve 414 may be configured to allow oil to flow through the vent line 706 from the pressure control valve 414 to the oil filter 502 (as shown in FIG. 5) to alleviate oil pressure rising higher than the threshold pressure in the pressure control valve 414. Oil may continue flowing through the vent line 706 until the pressure control valve 414 is repaired or replaced.

Oil flowing through the vent line 706 to alleviate oil pressure in the head 410 may be returned to the oil filter 502 (as shown in FIG. 5) and to the oil sump, travelling through the vent line 706 in an opposite direction relative to flow through the oil feed line 504 as indicated by arrows 714 shown in FIG. 7. Thus at least a portion of oil flowing through the oil feed line 504 from the oil filter 502 to the pressure control valve 414 may circulate between the pressure control valve 414 and oil filter 502 via the oil feed line 504 and the vent line 706 when the pressure in the pressure control valve 414 is higher than the threshold pressure or when the pressure control valve is degraded.

As shown in FIGS. 4 and 7, the oil feed line 504 and the vent line 706 may both extend away from the pressure control valve 414 to the left and wrap around the left side of the engine 404 to continue to the oil filter 502. The oil feed line 504 and the vent line 706 may be secured to one another and to exterior surfaces of the engine 404 by one or more clamps 428, as shown in FIGS. 4-6. The clamps 428 may be oval or shaped like a FIG. 8, configured to circumferentially surround both the oil feed line 504 and the vent line 706 and be fixedly attached to the engine 404 by a fastener. The clamps 428 may be formed of a strip of metal at least partially covered by a more flexible, heat-resistant material such as rubber. The oil feed line 504 and the vent line 706 may be in contact with one another at least at each of the clamps 428. Variations in a number of clamps 428 used may differ from the amounts shown in FIGS. 4-6.

By adapting a lubricant system of an engine with a pressure regulation system such as the pressure regulation system 402 of FIGS. 4-7, pressure amongst oil galleries in a head of an engine may be maintained more uniform. Each oil gallery in the head is similarly coupled to a pressure control valve, e.g., the pressure control valve 414 of FIGS. 4 and 7, via oil passages external to the engine thereby providing a uniform hydraulic pressure across all oil galleries in the head. The pressure control valve may reduce an oil pressure communicated from a main oil gallery of the engine prior to distributing the oil to the oil galleries in the head. The oil pressure provided by pressure regulation system may be delivered exclusively to the head, adding to oil pressure supplied by the internal oil passages of the engine.

Implementation of the pressure regulation system 402 of FIGS. 4-7 rather than, for example, a pressure relief valve system, may provide other benefits in addition to pressure consistency across the oil galleries in the head. The pressure regulation system 402 may enable control of oil gallery pressure over a wider range of flow rates than the pressure relief valve. For example, a conventional pressure relief valve system may not be adapted to control pressure at flow rates lower than 2 gallons per minute (gpm) when a pressure of the main oil gallery is high, such as 75 psi. The pressure control valve of the pressure regulation system 402, however, may maintain control over oil gallery pressure at flow rates as low as 0.5 gpm at the same high main oil gallery pressure, thereby reducing a likelihood of aeration. At lower main oil gallery pressure, such as 60 psi, the pressure control valve may be able to regulate the oil gallery pressure in the head up to 40 psi while the pressure relief valve system may only reach 35 psi. Furthermore, the pressure control valve may be less likely to overshoot a target or threshold pressure that is lower than the main oil gallery pressure when the oil is cold.

A vent line of the pressure regulation system 402 enhances the ability of the pressure regulation system 402 to regulate pressure in the oil galleries of the head and mitigate pressure rise in the oil galleries of the head when the pressure control valve become degraded and stuck open by providing a route for oil pressure to be returned to an oil filter. In addition, the pressure regulation system 402 includes components configured to be arranged external to, e.g., outside of, the engine and may thus be readily retrofit to already existing engine systems.

Example operations of a pressure regulation system for an engine are shown in map 800 as shown in FIG. 8. The engine may have internal oil passages delivering oil from an oil reservoir, such as an oil sump, through an oil filter and to a main oil gallery in the engine block as well as oil galleries in a head of the engine. The pressure regulation system may be the pressure regulation system 402 of FIGS. 4-7, having an external oil feed line flowing oil from the oil filter to a pressure control valve. External oil passages may couple the pressure control valve to the oil galleries in a head of the engine, delivering oil to the oil galleries in addition to oil provided by the internal oil passages. The pressure control valve may be adapted with a vent line to flow oil from the pressure control valve to the oil filter and may be set to maintain a threshold pressure in the oil galleries in the head of the engine. Map 800 shows time plotted along the x-axis and increasing to the right. Engine speed is depicted at plot 802 and an opening of the pressure control valve, adjustable between a fully open (e.g., a maximum opening of the pressure control valve) and a closed position is shown at plot 804. A pressure in the oil galleries in the head is shown at plot 806, increasing along the y-axis, a pressure in an internal oil passage extending between the main oil gallery and the head oil galleries to flow oil from the main oil gallery and the head oil galleries is shown at plot 808, increasing along the y-axis, and flow rate of oil through the vent line is shown at plot 810, also increasing along the y-axis.

At to, the engine is operating (plot 802) and the pressure control valve is open (plot 804), at a position between fully open and closed as set by, for example, an operator prior to engine operation. The pressure control valve maintains the pressure in the head oil galleries at a threshold pressure 812, as shown at plot 806. The oil pressure in the internal oil passage (plot 808) flowing oil from the main oil gallery to the head oil galleries fluctuates according to engine speed due to coupling of an oil pump to a crankshaft of the engine. Oil does not flow through the vent line (plot 810). At t1, the pressure in the internal oil passage decreases in response to a decrease in engine speed. For example, the engine may enter an idling mode at a high engine temperature, the heated oil having a low viscosity that leads to a decrease in oil pressure. The pressure control valve remains open, maintaining the head oil galleries at the threshold pressure 812, and oil does not flow through the vent line. Depending on engine speed falling below a threshold speed, such as 3000 rpm, the main oil gallery pressure and pressure in the external oil feed line falls below a set point of the pressure regulation system, such as 40 psi. The pressure in the head oil galleries also drop due to lack of oil delivery from the pressure regulation system.

At t2, the engine speed increases so that the pressure in the internal oil passage rises. At The pressure control valve remains open and the pressure in the oil galleries is maintained at the threshold pressure 812. Oil does not flow through the vent line.

Engine operation continues between t2 and t3 with the engine speed higher than at t2, the pressure in the internal oil passage higher than at t2, and pressure in the head oil galleries regulated by the open pressure control valve. At t3 the pressure control valve becomes degraded and unable to regulate pressure. For example, a diagram of the pressure control valve may be ruptured or lose a sealing engagement within the pressure control valve due to prolonged exposure to heat and pressure. The degraded pressure control valve is no longer able to control pressure delivered to the head oil galleries through the external oil passages and a higher pressure in the oil feed line may be transmitted directly to the head oil galleries, causing pressure in the head oil galleries to rise at t3. In response to the increasing pressure in the head oil galleries, oil may flow through the vent line.

Rising pressure in the head oil galleries is offset by the flow through the vent line, alleviating the pressure increase in the head oil galleries and returning the pressure to the threshold pressure 812 at t4 by circulating oil from the head oil galleries to the oil reservoir. Oil may continue flowing through the vent line until mitigating actions are performed, such as stopping the engine and replacing or repairing the pressure control valve.

In this way a hydraulic pressure may be maintained uniform across cylinder head oil galleries of an engine. The engine may be adapted with a pressure regulation system including external passages delivering a hydraulic fluid, such as oil, from an oil reservoir to the cylinder head oil galleries. A pressure control valve is coupled to each of the external passages, reducing a hydraulic pressure of the oil delivered to the cylinder head oil galleries, downstream of the pressure control valve, relative to the hydraulic pressure upstream of the pressure control valve. The pressure control valve may have a vent line configured to vent excess hydraulic pressure above a preset pressure threshold of the pressure control valve by flowing oil from the cylinder head oil galleries to the oil reservoir. The vent line precludes use of a bypass line which may otherwise incur parasitic losses and enables the pressure regulation system to continue regulating pressure in the cylinder head oil galleries even if the pressure control valve becomes degraded. Components of the pressure regulation system are arranged external to the engine, allowing the system to be configured as a retrofit kit adaptable to a variety of engine types.

The technical effect of adapting an engine with the pressure regulation system of FIGS. 4-7 is that a valvetrain of the engine is maintained more stable and parasitic losses are reduced.

FIGS. 3-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a system includes delivery lines, arranged external to an engine, the delivery lines coupling an oil reservoir of the engine to a plurality of cylinder head oil galleries along an external surface of the engine, the oil reservoir also coupled to the plurality of cylinder head oil galleries via oil passages internal to the engine, a pressure control valve, arranged external to the engine, for controlling an amount of hydraulic fluid delivered through the delivery lines, each of the delivery lines coupled to the pressure control valve, and an external vent line configured to couple the pressure control valve to the oil reservoir when the pressure control valve is degraded. In a first example of the system, the delivery lines include an oil feed line flowing oil from the oil reservoir to the pressure control valve with a first amount of hydraulic pressure. A second example of the system optionally includes the first example, and further includes, wherein the delivery lines include external passages flowing oil from the pressure control valve to the each of the plurality of cylinder head oil galleries with a second amount of hydraulic pressure, the second amount lower than the first amount of hydraulic pressure. A third example of the system optionally includes one or more of the first and second examples, and further includes, wherein the external passages each include an end configured to couple to a respective cylinder head oil gallery through a respective inlet opening in a wall of the engine. A fourth example of the system optionally includes one or more of the first through third examples, and further includes, wherein the pressure control valve has an inlet positioned at a bottom side of the pressure control valve, outlets positioned at oppositely arranged sides of the pressure control valve, and a mechanism for adjusting oil flow through the pressure control valve positioned at a top side of the pressure control valve. A fifth example of the system optionally includes one or more of the first through fourth examples, and further includes, wherein the vent line is coupled to the pressure control valve at the top side of the pressure control, adjacent to the mechanism for adjusting oil flow through the pressure control device. A sixth example of the system optionally includes one or more of the first through fifth examples, and further includes, wherein the pressure control valve is mounted to the external surface of the engine at a side opposite of a location of an oil filter of the engine. A seventh example of the system optionally includes one or more of the first through sixth examples, and optionally includes, wherein the oil flows from the pressure control valve to the oil reservoir through the vent line. An eighth example of the system optionally includes one or more of the first through seventh examples, and further includes, wherein the oil delivered to the plurality of cylinder head oil galleries provides hydraulic pressure in addition to hydraulic pressure provided by the oil passage internal to the engine block.

In another embodiment, a system includes an oil sump arranged below an engine block, a cylinder head arranged above the engine block, an internal passage, internal to the engine block and coupling the oil sump to cylinder head oil galleries of the engine, one or more external passages, external to both the engine block and the cylinder head, also coupling the oil sump to the cylinder head oil gallery, the one or more external passages separate from the internal passage, a pressure control valve coupled to each of the one or more external passages, the pressure control valve having a vent line configured to flow oil to the oil sump when a pressure in the cylinder head oil gallery rises above a threshold pressure. In a first example of the system, the one or more external passages flow oil to the cylinder head oil galleries simultaneous with oil flowing to the cylinder head oil galleries from the internal passage. A second example of the system optionally includes the first example, and further includes, wherein the one or more external passages includes a feed line coupled at a first end to an oil filter, the oil filter arranged between the feed line and the oil sump, and coupled at a second end to the pressure control valve and wherein the feed line is configured to deliver oil from the oil sump to the pressure control valve via the oil filter. A third example of the system optionally includes one or more of the first and second examples, and further includes, wherein the one or more external passages includes a first passage delivering oil from the pressure control valve to a first set of galleries of the cylinder head oil galleries and a second passage delivering oil from the pressure control valve to a second set of galleries of the cylinder head oil galleries. A fourth example of the system optionally includes one or more of the first through third examples, and further includes, wherein a hydraulic pressure in the feed line is higher than a hydraulic pressure in each of the first and second passages. A fifth example of the system optionally includes one or more of the first through fourth examples, and further includes, wherein the pressure control valve is configured to maintain a uniform hydraulic pressure to the first and second passages by adjusting an amount of oil flowing through the pressure control valve to the first and second passages. A sixth example of the system optionally includes one or more of the first through fifth examples, and further includes, wherein the pressure threshold is set at the pressure control valve and wherein when the pressure control valve is degraded and stuck open, oil flows from the pressure control valve to the oil sump through the vent line.

In yet another embodiment, a kit includes a pressure control valve, a feed line coupled to an inlet of the pressure control valve, passages coupled to outlets of the pressure control valve at first ends of each of the passages and configured to couple to oil galleries in a cylinder head of the engine at second ends of each of the passages, a vent line connected to the pressure control valve and configured to vent oil from the oil galleries in the cylinder head when a hydraulic pressure in the oil galleries increases above a threshold pressure. In a first example of the kit, the pressure control valve, the feed line, the passages, and the vent line are all configured to be positioned external to the engine. A second example of the kit optionally includes the first example, and further includes, wherein the kit is configured to be coupled to a wet oil sump of the engine. A third example of the kit optionally includes one or more of the first and second examples, and further includes, wherein the kit is configured to be coupled to a dry oil sump of the engine.

In another representation, a pressure regulation system for an engine includes a pressure control valve having a vent line and arranged externally at a rear side of the engine, a set of external passages branching from the pressure control valve and coupling each of an oil reservoir of the engine and cylinder head oil galleries to the pressure control valve and wherein a uniform pressure is maintained at each of the cylinder head oil galleries by the pressure control valve.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
   delivery lines, arranged external to an engine, the delivery lines coupling an oil reservoir of the engine to a plurality of cylinder head oil galleries along an external surface of the engine, the oil reservoir also coupled to the plurality of cylinder head oil galleries via oil passages internal to the engine;
   a pressure control valve, arranged external to the engine, for controlling an amount of hydraulic fluid delivered through the delivery lines, each of the delivery lines coupled to the pressure control valve; and
   an external vent line configured to couple the pressure control valve to the oil reservoir when a pressure in the cylinder head oil galleries rises above a threshold pressure, and when the pressure control valve is degraded and stuck open, wherein the threshold pressure is set at the pressure control valve.

2. The system of claim 1, wherein the delivery lines include an oil feed line flowing oil from the oil reservoir to the pressure control valve with a first amount of hydraulic pressure.

3. The system of claim 2, wherein the delivery lines include external passages flowing oil from the pressure control valve to the each of the plurality of cylinder head oil galleries with a second amount of hydraulic pressure, the second amount lower than the first amount of hydraulic pressure.

4. The system of claim 3 wherein the external passages each include an end configured to couple to a respective cylinder head oil gallery through a respective inlet opening in a wall of the engine.

5. The system of claim 1, wherein the pressure control valve has an inlet positioned at a bottom side of the pressure control valve, outlets positioned at oppositely arranged sides of the pressure control valve, and a mechanism for adjusting oil flow through the pressure control valve positioned at a top side of the pressure control valve.

6. The system of claim 5, wherein the vent line is coupled to the pressure control valve at the top side of a pressure control device, adjacent to the mechanism for adjusting oil flow through the pressure control device.

7. The system of claim 1, wherein the pressure control valve is mounted to the external surface of the engine at a side opposite of a location of an oil filter of the engine.

8. The system of claim 7, wherein the oil flows from the pressure control valve to the oil reservoir through the vent line.

9. The system of claim 1, wherein the oil delivered to the plurality of cylinder head oil galleries provides hydraulic pressure in addition to hydraulic pressure provided by the oil passages internal to an engine block.

10. A lubricant system for an engine, comprising;
    an oil sump arranged below an engine block;
    a cylinder head arranged above the engine block;
    an internal passage, internal to the engine block and coupling the oil sump to cylinder head oil galleries of the engine;
    one or more external passages, external to both the engine block and the cylinder head, also coupling the oil sump to the cylinder head oil galleries, the one or more external passages separate from the internal passage; and
    a pressure control valve coupled to each of the one or more external passages, the pressure control valve having a vent line configured to flow oil to the oil sump when a pressure in the cylinder head oil galleries rises above a threshold pressure, wherein the threshold pressure is set at the pressure control valve and wherein, when the pressure control valve is degraded and stuck open, oil flows from the pressure control valve to the oil sump through the vent line.

11. The lubricant system of claim 10, wherein the one or more external passages flow oil to the cylinder head oil galleries simultaneous with oil flowing to the cylinder head oil galleries from the internal passage.

12. The lubricant system of claim 10, wherein the one or more external passages includes a feed line coupled at a first end to an oil filter, the oil filter arranged between the feed line and the oil sump, and coupled at a second end to the pressure control valve and wherein the feed line is configured to deliver oil from the oil sump to the pressure control valve via the oil filter.

13. The lubricant system of claim 12, wherein the one or more external passages includes a first passage delivering oil from the pressure control valve to a first set of galleries of the cylinder head oil galleries and a second passage delivering oil from the pressure control valve to a second set of galleries of the cylinder head oil galleries.

14. The lubricant system of claim 13, wherein a hydraulic pressure in the feed line is higher than a hydraulic pressure in each of the first and second passages.

15. The lubricant system of claim 14, wherein the pressure control valve is configured to maintain a uniform hydraulic pressure to the first and second passages by adjusting an amount of oil flowing through the pressure control valve to the first and second passages.

16. A kit for an engine, comprising;
    a pressure control valve;
    a feed line coupled to an inlet of the pressure control valve;
    passages coupled to outlets of the pressure control valve at first ends of each of the passages and configured to couple to oil galleries in a cylinder head of the engine at second ends of each of the passages; and
    a vent line connected to the pressure control valve and configured to vent oil from the oil galleries in the cylinder head when a hydraulic pressure in the oil galleries increases above a threshold pressure, wherein the threshold pressure is set at the pressure control valve and wherein, when the pressure control valve is degraded and stuck open, oil flows from the pressure control valve to the oil sump through the vent line.

17. The kit of claim 16, wherein the pressure control valve, the feed line, the passages, and the vent line are all configured to be positioned external to the engine.

18. The kit of claim 16, wherein the kit is configured to be coupled to a wet oil sump of the engine.

19. The kit of claim 16, wherein the kit is configured to be coupled to a dry oil sump of the engine.

\* \* \* \* \*